US012170794B2

(12) United States Patent
Shima

(10) Patent No.: US 12,170,794 B2
(45) Date of Patent: Dec. 17, 2024

(54) IMAGE ENCODING DEVICE, IMAGE ENCODING METHOD AND STORAGE MEDIUM, IMAGE DECODING DEVICE, AND IMAGE DECODING METHOD AND STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 17/931,450

(22) Filed: Sep. 12, 2022

(65) Prior Publication Data

US 2023/0007311 A1 Jan. 5, 2023

Related U.S. Application Data

(63) Continuation of application No. PCT/JP2021/006754, filed on Feb. 24, 2021.

(30) Foreign Application Priority Data

Mar. 18, 2020 (JP) .................................. 2020-048201

(51) Int. Cl.
*H04N 19/89* (2014.01)
*H04N 19/124* (2014.01)
(Continued)

(52) U.S. Cl.
CPC ........... *H04N 19/89* (2014.11); *H04N 19/124* (2014.11); *H04N 19/18* (2014.11); *H04N 19/60* (2014.11)

(58) Field of Classification Search
CPC .............. H04N 19/124; H04N 19/132; H04N 19/159; H04N 19/176; H04N 19/18;
(Continued)

(56) References Cited

U.S. PATENT DOCUMENTS 11,523,126 B2 * 12/2022 Fan .................. H04N 19/70
11,647,229 B2 * 5/2023 Zhang ................ H04N 19/11
375/240.03
2022/0191492 A1 * 6/2022 Xu .................. H04N 19/122

FOREIGN PATENT DOCUMENTS

CN 110636313 A * 12/2019 ........... H04N 19/147
JP 2014131172 A 7/2014
(Continued)

OTHER PUBLICATIONS

Vivienne Sze, et al, "High Efficiency Video Coding (HEVC)" pp. 141-169, © 2024 Springer Nature #151.207.250.211 (Year: 2014).*
Mohsen Abdoli et al., AHG11: Block DPCM for Screen Content Coding, Joint video Experts Team (JVET) of ITU-T SG 16 WP3 and ISO/IEC JTC 1/SC 29/WG 11, Oct. 2018, Macao, CN, Doc. No. JVET-L0078 (Year: 2018).*
(Continued)

*Primary Examiner* — Dramos Kalapodas
(74) *Attorney, Agent, or Firm* — Canon U.S.A., Inc. IP Division

(57) ABSTRACT

An image encoding device includes a prediction unit configured to generate prediction errors being a difference between a predicted image obtained by prediction processing for an input image and the input image, a first transform unit configured to generate first transform coefficients by performing orthogonal transform on the prediction errors, a second transform unit configured to generate second transform coefficients by performing LFNST processing on the first transform coefficients, a quantization unit configured to generate quantization coefficients by performing quantization processing on the second transform coefficients, and an encoding unit configured to encode the quantization coefficients, wherein the encoding unit encodes information indicating whether a range of possible values at least taken by the second transform coefficients is to be a range determined based on a bit depth or a fixed range.

12 Claims, 8 Drawing Sheets

(51) Int. Cl.
*H04N 19/18* (2014.01)
*H04N 19/60* (2014.01)

(58) Field of Classification Search
CPC ...... H04N 19/186; H04N 19/46; H04N 19/60; H04N 19/70; H04N 19/157; H04N 19/12; H04N 19/89
See application file for complete search history.

(56) References Cited

FOREIGN PATENT DOCUMENTS

| | | | |
|---|---|---|---|
| JP | 2016519514 A | 6/2016 | |
| JP | 2017514353 A | 6/2017 | |
| WO | 2017195666 A1 | 3/2019 | |
| WO | 2020216299 A1 | 10/2020 | |
| WO | WO-2020219733 A1 * | 10/2020 | ........... H04N 19/105 |

OTHER PUBLICATIONS

Benjamin Bross, et al., Versatile Video Coding (Draft 8), Joint Video Experts Team (JVET) of ITU-T SG 16 WP 3 and ISO/IEC JTC 1/SC 29/WG 11, 17th Meeting, Brussels, BE, Jan. 7-17, 2020, Doc. No. JVET-Q2001-vE.

David Flynn, et al., High Efficiency Video Coding (HEVC) Range Extensions text specification: Draft 7, Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, Doc. No. JCTVC-Q1005-v7.

M. Koo, et al., Low Frequency Non-Separable Transform (LFNST), 2019 Picture Coding Symposium (PCS), Nov. 12-15, 2019.

Tianyang Zhou, et al., Transform coefficients range extension for high bit depth, Joint Video Experts Team (JVET) of ITU-T SG 16 WP 3 and ISO/IEC JTC 1/SC 29/WG 11, 19th Meeting: by teleconference, Jun. 22-Jul. 1, 2020, Doc. No. JVET-S0228_v2.

Mohsen Abdoli et al., AHG11: Block DPCM for Screen Content Coding, Joint video Experts Team (JVET) of ITU-T SG 16 WP3 and ISO/IEC JTC 1/SC 29/WG 11, Oct. 2018, Macao, CN, Doc. No. JVET-L0078.

* cited by examiner

| COEFFICIENT RANGE INFORMATION | INPUT/OUTPUT IMAGE BIT DEPTH | MINIMUM COEFFICIENT VALUE | MAXIMUM COEFFICIENT VALUE |
|---|---|---|---|
| 0 | 8 | $-32768 (= -2^{15})$ | $32767 (= 2^{15}-1)$ |
| 0 | 9 | $-32768 (= -2^{15})$ | $32767 (= 2^{15}-1)$ |
| 0 | 10 | $-32768 (= -2^{15})$ | $32767 (= 2^{15}-1)$ |
| 0 | 11 | $-32768 (= -2^{15})$ | $32767 (= 2^{15}-1)$ |
| 0 | 12 | $-32768 (= -2^{15})$ | $32767 (= 2^{15}-1)$ |
| 0 | 13 | $-32768 (= -2^{15})$ | $32767 (= 2^{15}-1)$ |
| 0 | 14 | $-32768 (= -2^{15})$ | $32767 (= 2^{15}-1)$ |
| 0 | 15 | $-32768 (= -2^{15})$ | $32767 (= 2^{15}-1)$ |
| 0 | 16 | $-32768 (= -2^{15})$ | $32767 (= 2^{15}-1)$ |
|  |  |  |  |
| 1 | 8 | $-32768 (= -2^{15})$ | $32767 (= 2^{15}-1)$ |
| 1 | 9 | $-65536 (= -2^{16})$ | $65535 (= 2^{16}-1)$ |
| 1 | 10 | $-131072 (= -2^{17})$ | $131071 (= 2^{17}-1)$ |
| 1 | 11 | $-262144 (= -2^{18})$ | $262143 (= 2^{18}-1)$ |
| 1 | 12 | $-524288 (= -2^{19})$ | $524287 (= 2^{19}-1)$ |
| 1 | 13 | $-1048576 (= -2^{20})$ | $1048575 (= 2^{20}-1)$ |
| 1 | 14 | $-2097152 (= -2^{21})$ | $2097151 (= 2^{21}-1)$ |
| 1 | 15 | $-4194304 (= -2^{22})$ | $4194303 (= 2^{22}-1)$ |
| 1 | 16 | $-8388608 (= -2^{23})$ | $8388607 (= 2^{23}-1)$ |

IMAGE ENCODING DEVICE, IMAGE ENCODING METHOD AND STORAGE MEDIUM, IMAGE DECODING DEVICE, AND IMAGE DECODING METHOD AND STORAGE MEDIUM

CROSS-REFERENCE TO RELATED APPLICATIONS

This application is a Continuation of International Patent Application No. PCT/JP2021/006754, filed Feb. 24, 2021, which claims the benefit of Japanese Patent Application No. 2020-048201, filed Mar. 18, 2020, both of which are hereby incorporated by reference herein in their entirety.

BACKGROUND OF THE INVENTION

Field of the Invention

The present invention relates to image encoding.

Background Art

As an encoding scheme for compression recording of a moving image, there is known a High Efficiency Video Coding (HEVC) encoding scheme (hereinafter, written as HEVC). In the HEVC, a plurality of profiles that defines restrictions on encoding technology is defined, and a Main 10 profile supports an image of a bit depth ranging from 8 bits to 10 bits. In addition, in the HEVC, a profile supporting an image of 12 bits and an image of 16 bits is also defined to support an image of a higher bit depth as well. Japanese Patent Application Laid-Open No. 2014-131172 discusses an encoding technique that supports an image encoding scheme supporting such a high-bit depth.

International standardization of a more efficient encoding scheme as a successor to the HEVC has recently been started. The Joint Video Experts Team (JVET) has been established by the ISO/IEC and the ITU-T, and standardization of a Versatile Video Coding (VVC) encoding scheme (hereinafter, VVC) has been underway. In the VVC, in order to improve encoding efficiency, a new technique of, in addition to performing conventional orthogonal transform, further performing secondary transform (LFNST, hereinafter referred to as low-frequency transform) on a low-frequency component of coefficients subjected to the orthogonal transform (hereinafter, written as orthogonal transform coefficients) has been also discussed.

CITATION LIST

Patent Literature

PTL 1: Japanese Patent Application Laid-Open No. 2014-131172

SUMMARY OF THE INVENTION

In VVC, a limit is added to a value of a processing result in encoding processing such as orthogonal transform and quantization to increase the ease of implementation. Specifically, possible values for coefficients subjected to quantization processing (hereinafter, written as quantization coefficients) is limited to −32768 to 32767, so that implementation of coefficient encoding processing and inverse-quantization processing on decoding side is made easier. It is considered that, in the VVC, the implementation cost of hardware will not be much increased even in a case where an image of a high-bit depth is encoded. Meanwhile, the above-described limit causes a reduction in arithmetic precision for, in particular, an image of a high-bit depth, so that an issue such as no improvement in image quality has arisen.

To adaptively determine a range of possible values for coefficient values in encoding or decoding processing, an image encoding device according to the present invention includes, for example, the following configuration. That is, the image encoding device includes a prediction unit configured to generate prediction errors being a difference between a predicted image obtained by prediction processing for an input image and the input image, a first transform unit configured to generate first transform coefficients by performing orthogonal transform on the prediction errors, a second transform unit configured to generate second transform coefficients by performing LFNST processing on the first transform coefficients, a quantization unit configured to generate quantization coefficients by performing quantization processing on the second transform coefficients, and an encoding unit configured to encode the quantization coefficients, wherein the encoding unit encodes information indicating whether a range of possible values at least taken by the second transform coefficients is to be a range determined based on a bit depth or a fixed range.

Further, to solve the problem described above, an image decoding device according to the present invention includes, for example, the following configuration. That is, the image decoding device that decodes an image from an input bitstream includes a decoding unit configured to decode quantization coefficients from the bitstream, an inverse-quantization unit configured to derive first transform coefficients by performing inverse-quantization processing on the quantization coefficients, a first transform unit configured to derive second transform coefficients by performing inverse LFNST processing on the first transform coefficients, and a second transform unit configured to derive prediction errors by performing inverse orthogonal transform processing on the second transform coefficients, wherein the decoding unit decodes information indicating whether a range of possible values at least taken by the first transform coefficients is to be a range determined based on a bit depth or a fixed range, from the bitstream.

Further, to solve the problem described above, an image encoding device according to the present invention includes, for example, the following configuration. That is, the image encoding device includes a prediction unit configured to generate prediction errors being a difference between a predicted image obtained by prediction processing for an input image and the input image, and an encoding unit configured to encode the prediction errors, using at least BDPCM processing, wherein the encoding unit encodes information indicating whether a range of values obtained by at least the BDPCM processing is to be a range determined based on a bit depth or a fixed range.

Further, to solve the problem described above, an image decoding device according to the present invention includes, for example, the following configuration. That is, the image decoding device that decodes an image from an input bitstream includes a decoding unit configured to decode quantization coefficients from the bitstream, and an inverse-quantization unit configured to derive prediction errors from the quantization coefficients, using at least BDPCM processing, wherein the decoding unit decodes information indicating whether a range of values obtained by at least the BDPCM processing is to be a range determined based on a bit depth or a fixed range, from the bitstream.

Further features of the present invention will become apparent from the following description of exemplary embodiments with reference to the attached drawings.

BRIEF DESCRIPTION OF THE DRAWINGS

FIG. 8 is a diagram illustrating a relationship among coefficient range information, a bit depth of an image, and a possible range of coefficients.

DESCRIPTION OF THE EMBODIMENTS

Figure 1:
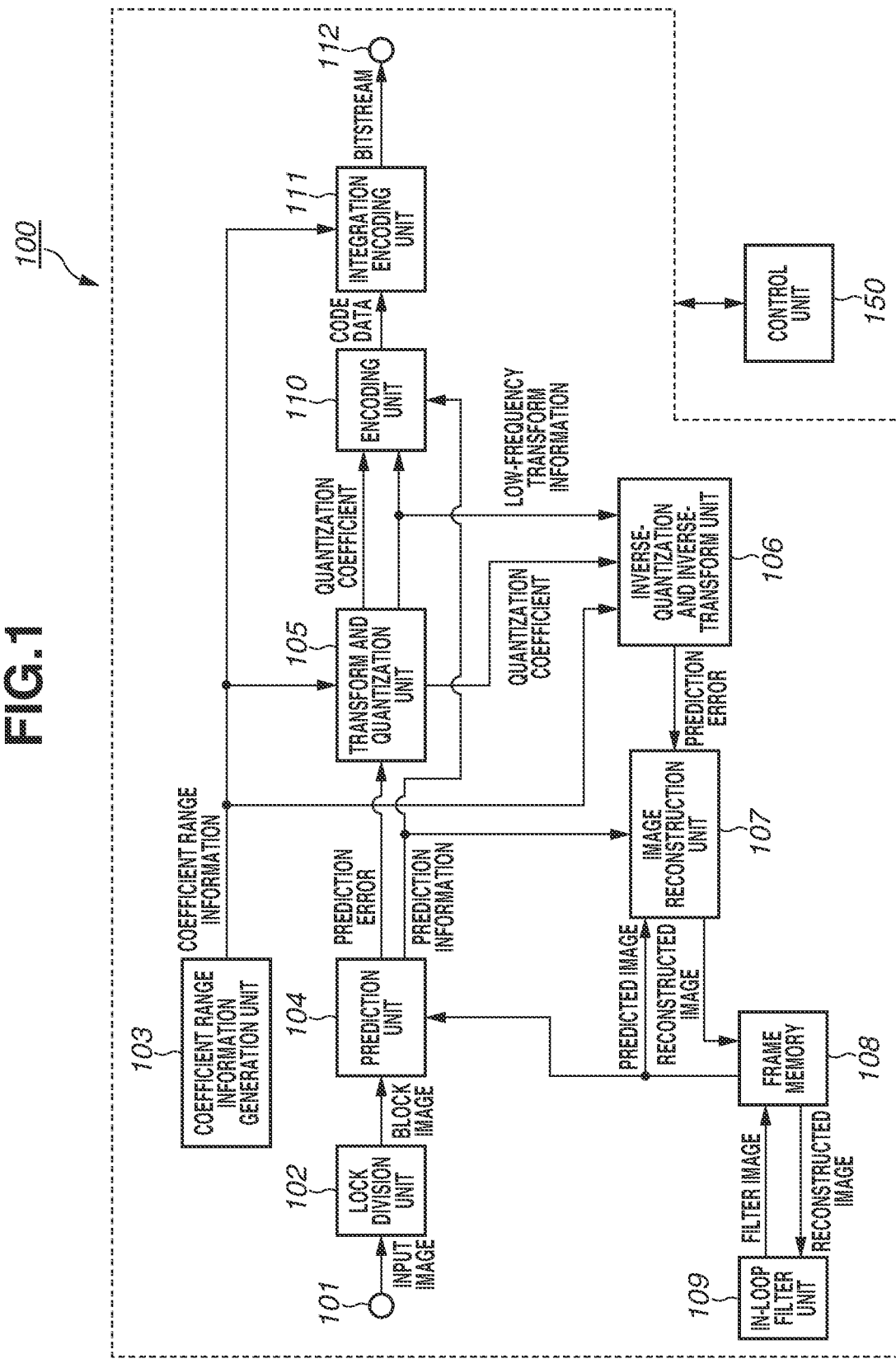
FIG. 1 is a block diagram illustrating a configuration of an image encoding device.

Exemplary embodiments will be described in detail below with reference to the attached drawings. Configurations to be described in the following exemplary embodiments are only examples, and the present invention is not limited to the configurations illustrated in the drawings.

First Exemplary Embodiment

A plurality of features is described in an exemplary embodiment, but all of these plurality of features may not be essential to the invention, and the plurality of features may be freely combined. Further, in the attached drawings, the same or similar configurations are assigned the same reference numerals, and the description thereof will not be repeated.

FIG. 1 is a block diagram illustrating a configuration of an image encoding device 100 according to the present exemplary embodiment. The image encoding device 100 includes a control unit 150 that controls the entire device. The control unit 150 includes a CPU, a ROM storing a program to be executed by the CPU, and a RAM to be used as a work area of the CPU. The image encoding device 100 further includes an input terminal 101, a block division unit 102, a coefficient range information generation unit 103, a prediction unit 104, a transform and quantization unit 105, an inverse-quantization and inverse-transform unit 106, an image reconstruction unit 107, a frame memory 108, an in-loop filter unit 109, an encoding unit 110, an integration encoding unit 111, and an output terminal 112.

The input terminal 101 inputs image data to be encoded, frame by frame. The image data is acquired from an imaging device that captures an image, a file server, a storage medium or the like storing image data to be encoded, and such a source may be of any type. The output terminal 112 outputs encoded data to a destination device, and the destination device may also be of any type, such as a storage medium, a file server, or the like.

The block division unit 102 divides an image of an input frame (picture) into a plurality of basic blocks, and sequentially outputs one of the blocks as a basic block to the prediction unit 104 in the subsequent stage. Further, for example, a block of 128×128 pixels, a block of 64×64 pixels, or a block of 3×32 pixels may be used as a basic block. Further, a smaller block may be used as a basic block. Further, a basic block is, for example, a coding tree unit or a coding unit. A basic block may be any unit if the unit can be further divided into smaller subblocks.

The coefficient range information generation unit 103 generates coefficient range information indicating a range of possible values for coefficient values that are a result of each encoding processing to be described below, and outputs the generated information to the transform and quantization unit 105, the inverse-quantization and inverse-transform unit 106, and the integration encoding unit 111 in the subsequent stages.

The prediction unit 104 determines subblock division for image data in units of basic blocks. At this time, the prediction unit 104 determines whether to divide the basic block into subblocks, and determines how the basic block is to be divided if the basic block is to be divided. In a case where the basic block is not divided into subblocks, the size of a subblock is the same as that of the basic block. The subblock may be a square, and may be a rectangle other than the square.

Subsequently, the prediction unit 104 generates predicted image data in units of subblocks by performing intra-prediction that is intra-frame prediction, inter-prediction that is inter-frame prediction, or the like. At this time, for example, the prediction unit 104 selects a prediction method to be performed for a certain subblock, from the intra-prediction, the inter-prediction, and a combination of the intra-prediction and the inter-prediction, and performs the selected prediction to generate predicted image data for the subblock.

Further, the prediction unit 104 calculates prediction errors in units of pixels from the input image data and the predicted image data in units of subblocks, and outputs the calculated prediction errors. For example, the prediction unit 104 calculates a difference between each pixel value of the image data of the subblock and each pixel value of the predicted image data generated by the prediction for the subblock, and determines the calculated differences as the prediction errors.

In addition, the prediction unit 104 outputs information necessary for the prediction, e.g., information indicating the subblock division (the state of the basic block divided into the subblocks) (i.e, information indicating how the basic block is divided into the subblocks), together with the prediction errors. The prediction unit 104 also outputs information such as a prediction mode and a motion vector used in the prediction of the subblock, together with the prediction errors. This information necessary for the prediction will be hereinafter referred to as prediction information.

The transform and quantization unit 105 obtains orthogonal transform coefficients representing each frequency component of the prediction errors by orthogonally transforming the prediction errors input from the prediction unit 104 subblock by subblock. Further, the transform and quantization unit 105 determines whether to perform low-frequency transform on a low-frequency part of the orthogonal transform coefficients, and generates information about this determination as low-frequency transform information. In other words, the low-frequency transform information is information indicating whether to perform the low-frequency transform on the low-frequency part of the orthogonal transform coefficients. In a case where the low-frequency transform is to be performed on the subblock, the transform and quantization unit 105 obtains low-frequency transform coefficients by performing low-frequency transform processing on the low-frequency part of the obtained orthogonal transform coefficients, and further obtains residual coefficients (orthogonal transform coefficients subjected to quantization) by quantizing the low-frequency transform coefficients. On the other hand, in a case where the low-frequency transform is not to be performed on the subblock, the transform and quantization unit 105 obtains residual coefficients by quantizing the orthogonal transform coefficients. The low-frequency transform indicates low-frequency non-separable transform (LFNST) processing, and this is processing for reconstructing (deriving) low-frequency transform coefficients by transforming an orthogonal transform coefficients.

The inverse-quantization and inverse-transform unit 106 receives the residual coefficients and the low-frequency transform information as input from the transform and quantization unit 105, and reconstructs transform coefficients by inversely quantizing the residual coefficients. At this time, the inverse-quantization and inverse-transform unit 106 reconstructs the transform coefficients, using a quantization matrix and a quantization parameter, for the residual coefficients input from the transform and quantization unit 105. The processing of reconstructing (deriving) the transform coefficients from the residual coefficients, using the quantization matrix and the quantization parameter, in such a manner will be referred to as inverse-quantization. The quantization matrix may not be necessarily used in inverse-quantization processing. In particular, in a case where the quantization matrix is not used in the quantization processing by the transform and quantization unit 105, the quantization matrix is not used in the inverse-quantization processing by the inverse-quantization and inverse-transform unit 106. In addition, it can be determined whether to apply the quantization matrix based on whether the low-frequency transform has been performed on the subblock. For example, in a case where the low-frequency transform has been performed on the subblock, the inverse-quantization is performed without using the quantization matrix, and otherwise, the inverse-quantization is performed using the quantization matrix.

Further, the inverse-quantization and inverse-transform unit 106 determines whether the low-frequency transform has been performed on the subblock, based on the input low-frequency transform information. In a case where the low-frequency transform has been performed on the subblock, the inverse-quantization and inverse-transform unit 106 reconstructs orthogonal transform coefficients by performing inverse low-frequency transform processing on the transform coefficients (the low-frequency transform coefficients) obtained by inversely quantizing the residual coefficients, and further reconstructs prediction errors by performing inverse orthogonal transform on the orthogonal transform coefficients. On the other hand, in a case where the low-frequency transform has not been performed on the subblock, the inverse-quantization and inverse-transform unit 106 reconstructs prediction errors by performing inverse orthogonal transform on the transform coefficients (the orthogonal transform coefficients) obtained by inversely quantizing the residual coefficients. The inverse low-frequency transform processing indicates inverse LFNST processing and is processing of reconstructing (deriving) orthogonal transform coefficients by transforming low-frequency transform coefficients.

The image reconstruction unit 107 refers to the frame memory 10 as appropriate and generates predicted image data based on the prediction information output from the prediction unit 104. The image reconstruction unit 107 generates reconstructed image data (reconstructed picture) by adding the prediction errors input from the inverse-quantization and inverse-transform unit 106 to this predicted image data, and stores the generated reconstructed image data into the frame memory 108.

The in-loop filter 109 performs in-loop filter processing such as deblocking filter or sample adaptive offset, on the reconstructed image stored in the frame memory 108, and stores the filter-processed image data again into the frame memory 108.

The encoding unit 110 generates code data by encoding the residual coefficients and the low-frequency transform information output from the transform and quantization unit 105 and the prediction information output from the prediction unit 104, and outputs the generated code data to the integration encoding unit 111.

The integration encoding unit 111 generates a coefficient range information code by encoding the coefficient range information from the coefficient range information generation unit 103. Subsequently, header code data including the coefficient range information code is generated. The integration encoding unit 111 then forms a bitstream by making the code data output from the encoding unit 110 follow the header code data. The integration encoding unit 111 then outputs the formed bitstream via the output terminal 112.

Here, the image encoding operation in the image encoding device will be described in detail below. In the present exemplary embodiment, a configuration in which 16-bit moving image data is input from the input terminal 101 frame by frame is adopted, but a configuration in which still image data for 1 frame is input may be adopted. Further, in the present exemplary embodiment, the block division unit 101 will be described to divide the image data input from the input terminal into basic blocks of 8×8 pixels, for the purpose of description. The basic block as used herein is, for example, a coding tree unit. Although an example in which the coding tree unit has a size of 8×8 pixels will be described, other sizes may be adopted. For example, any of a size of 32×32 pixels to a size of 128×128 pixels may be adopted.

Prior to image encoding, a range of possible values for coefficients in the encoding processing according to the present exemplary embodiment is determined.

The coefficient range information generation unit 103 generates coefficient range information indicating whether a range of possible values for the coefficients in the encoding processing is to be variable depending on the bit depth of an input image or the range is to be fixed irrespective of the bit depth. In the following, the former variable range of possible values for the coefficients in the encoding processing depending on the bit depth of the image will be referred to as high-precision coefficient range, and the latter range fixed irrespective of the bit depth will be referred to as fixed coefficient range. In the present exemplary embodiment, the coefficient range information is 1 in a case where the former high-precision coefficient range is selected, whereas the coefficient range information is 0 in a case where the latter fixed coefficient range is selected. However, the combination of the selected coefficient range and the coefficient range information is not limited to these. In addition, the method of determining the coefficient range information is not particularly limited, either and may be determined prior to the encoding processing, assuming an application to be used by the present encoding device and the corresponding decoding device, or may be selected by a user. For example, the coefficient range information is 1 in a case where the image encoding device 100 according to the present exemplary embodiment is assumed to use an application that gives top priority to image quality and places importance on arithmetic precision, and the coefficient range information is otherwise 0. The generated coefficient range information is output to the integration encoding unit 111, the transform and quantization unit 105, and the inverse-quantization and inverse-transform unit 106.

The integration encoding unit 111 generates a coefficient range information code by encoding the coefficient range information input from the coefficient range information generation unit 103, and integrates the generated coefficient range information code into header information necessary for encoding of image data.

Subsequently, encoding of image data is performed. Input image data for 1 frame from the input terminal 101 is supplied to the block division unit 102.

The block division unit 102 divides the input image data for 1 frame into a plurality of basic blocks, and outputs the image data in units of basic blocks to the prediction unit 104. In the present exemplary embodiment, the image data in units of basic blocks of 8×8 pixels is supplied to the prediction unit 104.

The prediction unit 104 executes prediction processing on the image data in units of basic blocks input from the block division unit 102. Specifically, subblock division of dividing the basic block into smaller subblocks is determined, and a prediction mode such as intra-prediction or inter-prediction is further determined subblock by subblock. The intra-prediction generates a prediction pixel of an encoding target block using an encoded pixel spatially located near the encoding target block, and also generates an intra-prediction mode indicating an intra-prediction method such horizontal prediction, vertical prediction, or DC prediction. The inter-prediction generates a prediction pixel of an encoding target block using an encoded pixel of a frame temporally different from the encoding target block, and also generates a frame to be referred to and motion information indicating a motion vector or the like.

A subblock division method will be described with reference to FIGS. 7A to 7F. A thick frame of each of blocks 700 to 705 in FIGS. 7A to 7F has a size of 8×8 pixels that is the same as that of the basic block. Each quadrangle inside the thick frame represents a subblock. FIG. 7B illustrates an example of conventional square subblock division, and the basic block 701 of 8×8 pixels is divided into four subblocks of 4×4 pixels. Meanwhile, FIG. 7C to FIG. 7F each illustrate an example of rectangular subblock division. FIG. 7C illustrates the basic block 702 that is divided into two subblocks (long in the vertical direction) each having a size of 4×8 pixels. FIG. 7D illustrates the basic block 703 that is divided into two subblocks (long in the horizontal direction) each having a size of 8×4 pixels. FIG. 7E and FIG. 7F respectively illustrate the basic blocks 704 and 705 that are each divided into three rectangular subblocks at a ratio of 1:2:1, although the division methods are different. In this way, the encoding processing is performed using not only square subblocks but also rectangular subblocks.

Figure 7A:
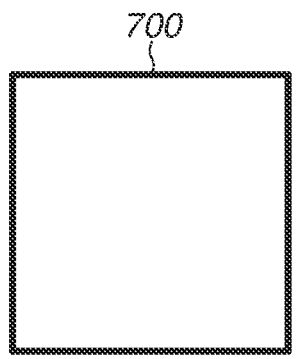
FIG. 7A is a diagram illustrating an example of subblock division.
Figure 7B:
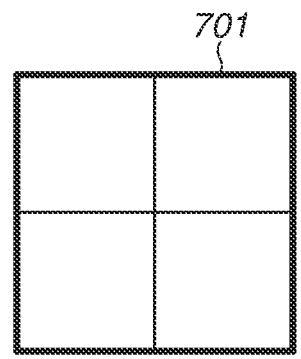
FIG. 7B is a diagram illustrating an example of subblock division.
Figure 7C:
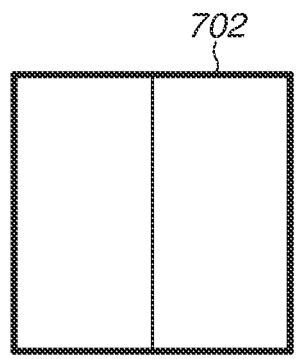
FIG. 7C is a diagram illustrating an example of subblock division.
Figure 7D:
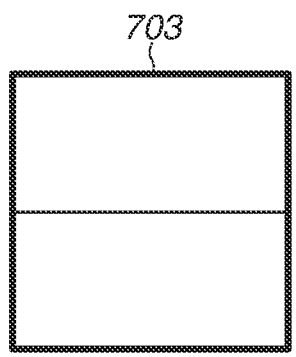
FIG. 7D is a diagram illustrating an example of subblock division.
Figure 7E:
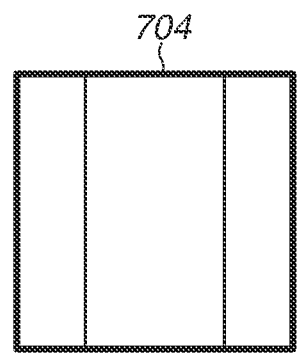
FIG. 7E is a diagram illustrating an example of subblock division.
Figure 7F:
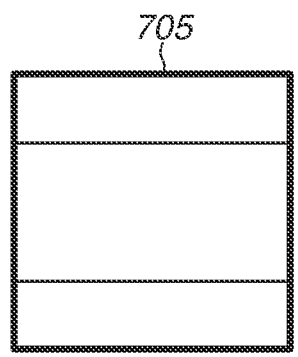
FIG. 7F is a diagram illustrating an example of subblock division.

In the present exemplary embodiment, only FIG. 7A in which the basic block having the size of 8×8 pixels is not divided into subblocks is used, but the subblock division method is not limited thereto. The quadtree division as illustrated in FIG. 7B, the ternary tree division as illustrated in FIG. 7E and FIG. 7F, or the binary tree division as illustrated in FIG. 7C and FIG. 7D may be used.

The prediction unit 104 generates predicted image data from the determined prediction mode and an encoded region stored in the frame memory 108, further calculates prediction errors in units of pixels from the input image data and the predicted image data, and outputs the calculated error to the transform and quantization unit 105. In addition, the prediction unit 104 outputs information about the subblock division, the prediction mode, and the like to the encoding unit 110 and the image reconstruction unit 107, as prediction information.

The transform and quantization unit 105 first receives the coefficient range information as input from the coefficient range generation unit 103, and determines a range of possible values for coefficients in transform processing or quantization processing. In the present exemplary embodiment, a range that can be taken by coefficients obtained as each of arithmetic results of one-dimensional orthogonal transform in each of horizontal and vertical directions, secondary transform of further transforming the coefficients subjected to orthogonal transform, quantization, and the like is determined based on a table illustrated in FIG. 8. However, the combination of the coefficient range information and the range that can be taken by the coefficients obtained as each of the arithmetic results is not limited thereto. In the present exemplary embodiment, because the bit depth of the input image is 16, a range of −32768 to 32767 or a range of −8388608 to 8388607 is used depending on the coefficient range information. Processing to be executed in a case where each of the arithmetic results falls outside the above-described range is not particularly limited, but the result can be adjusted to fall within the above-described range by clip processing or bit shift processing.

Next, the transform and quantization unit 105 generates residual coefficients by performing orthogonal transform and quantization on the prediction errors input from the prediction unit 104, based on the above-described coefficient range. Specifically, the transform and quantization unit 105 first generates orthogonal transform coefficients by performing orthogonal transform processing corresponding to the size of the subblock, on the prediction errors. Next, the transform and quantization unit 105 determines whether to perform low-frequency transform on a low-frequency part of the orthogonal transform coefficients, generates information about this determination as low-frequency transform information, and outputs the low-frequency transform information to the inverse-quantization and inverse-transform unit 106 and the encoding unit 110. The method of determining the low-frequency transform information is not particularly limited; however, in a case such as a case where the orthogonal transform coefficients are concentrated on the low-frequency component, and a further improvement in compression efficiency can expected by performing the low-frequency transform, the low-frequency transform can be further performed. In a case where the low-frequency transform is determined to be performed, the transform and quantization unit 105 generates low-frequency transform coefficients by performing the low-frequency transform on the low-frequency part of the orthogonal transform coefficients, and, on the other hand, a high-frequency component on which the low-frequency transform has not been performed is handled as 0, regardless of the values of the orthogonal transform coefficients. Then, in a case where the low-frequency transform has been performed, the transform and quantization unit 105 generates residual coefficients by quantizing the low-frequency transform coefficients. On the other hand, in a case where the low-frequency transform has not been performed, the transform and quantization unit 105 generates residual coefficients by quantizing the orthogonal transform coefficients.

As with the transform and quantization unit 105, the inverse-quantization and inverse-transform unit 106 first receives the coefficient range information as input from the coefficient range generation unit 103, and determines a range of possible values for coefficients in inverse-quantization processing or inverse-transform processing. In the present exemplary embodiment, as with the transform and quantization unit 105, a range that can be taken by coefficients obtained as each of arithmetic results of inverse-quantization processing, inverse low-frequency transform processing for a low-frequency component, one-dimensional inverse orthogonal transform in each of horizontal and vertical directions, and the like is determined based on the table illustrated in FIG. 8. In the present exemplary embodiment, as with the transform and quantization unit 105, because the bit depth of the input image is 16, a range of −32768 to 32767 or a range of −8388608 to 8388607 is to be taken depending on the coefficient range information.

Next, the inverse-quantization and inverse-transform unit 106 reconstructs transform coefficients by inversely quantizing the residual coefficients input from the transform and quantization unit 105, based on the above-described coefficient range. Further, the inverse-quantization and inverse-transform unit 106 determines whether the low-frequency transform has been performed on the subblock, based on the low-frequency transform information input from the transform and quantization unit 105. In a case where the low-frequency transform has been performed on the subblock, the inverse-quantization and inverse-transform unit 106 reconstructs orthogonal transform coefficients by performing inverse low-frequency transform processing on the transform coefficients, and further reconstructs prediction errors by performing inverse orthogonal transform on the orthogonal transform coefficients. On the other hand, in a case where the low-frequency transform has not been performed on the subblock, the inverse-quantization and inverse-transform unit 106 reconstructs prediction errors by performing inverse orthogonal transform on the transform coefficients. The prediction errors thus reconstructed are output to the image reconstruction unit 107.

$$y=\text{Clip3}(\text{CoeffMin},\text{CoeffMax},((\Sigma\text{lowFreqTransMatrix}[j]\times x)+64)>>7) \quad (1)$$

(where, Clip3 (a, b, c) indicates processing of clipping a value c using a minimum value a and a maximum value b, and ">>" represents a bit shift to the right.) The above expression (1) is one of calculation formulas used in the inverse low-frequency transform processing in the inverse-quantization and inverse-transform unit 106 according to the present exemplary embodiment. Here, CoeffMin of the expression (1) corresponds to a minimum coefficient value in FIG. 8, and CoeffMax of the expression (1) corresponds to a maximum coefficient value in FIG. 8. In the present exemplary embodiment, because the bit depth of the input image is 16 bits, the values of CoeffMin and CoeffMax of the expression (1) are determined based on the coefficient range information. In a case where the coefficient range information is 0, i.e., the fixed coefficient range is selected, CoeffMin is −32768 and CoeffMax is 32767, and an output value can be expressed in signed 16 bits. In this case, 16-bit addition/multiplication commands and the like can be used in the subsequent encoding processing, and thus there is an advantage that the implementation cost does not increase. On the other hand, in a case where the coefficient range information is 1, i.e., the high-precision coefficient range is selected, CoeffMin is −8388608, and CoeffMax is 8388607. In this case, an output value cannot be expressed in signed 16 bits, and thus the implementation cost in the subsequent encoding processing increases, but high arithmetic precision encoding processing suitable for a high-bit depth such as 16 bits can be realized. As a result, there are advantageous effects such as an improvement in compression efficiency and an increase in image quality when a bitstream of an encoding result is decoded.

The image reconstruction unit 107 refers to the frame memory 108 as appropriate and reconstructs a predicted image based on the prediction information input from the prediction unit 104. Subsequently, the image reconstruction unit 107 generates reconstructed image data based on the reconstructed predicted image and the prediction errors reconstructed by the inverse-quantization and inverse-transform unit 106, and stores the generated reconstructed image data into the frame memory 108.

The in-loop filter unit 109 reads out the reconstructed image data from the frame memory 108, and performs in-loop filter processing such as deblocking filter. Subsequently, the in-loop filter unit 109 stores the filter-processed image data into the frame memory 108 again.

The encoding unit 110 generates code data by entropically encoding the residual coefficients in units of subblocks and the low-frequency transform information generated in the transform and quantization unit 105, and the prediction information input from the prediction unit 104. The method for entropy encoding is not specified in particular, and Golomb encoding, arithmetic encoding, Huffman encoding, and the like can be used. The encoding unit 110 outputs the generated code data to the integration encoding unit 111.

The integration encoding unit 111 forms a bitstream by multiplexing the code data input from the encoding unit 110, and the like together with the header code data described above. Subsequently, the integration encoding unit 111 outputs the formed bitstream from the output terminal 112 to the outside (to a storage medium, a network, or the like).

Figure 6A:
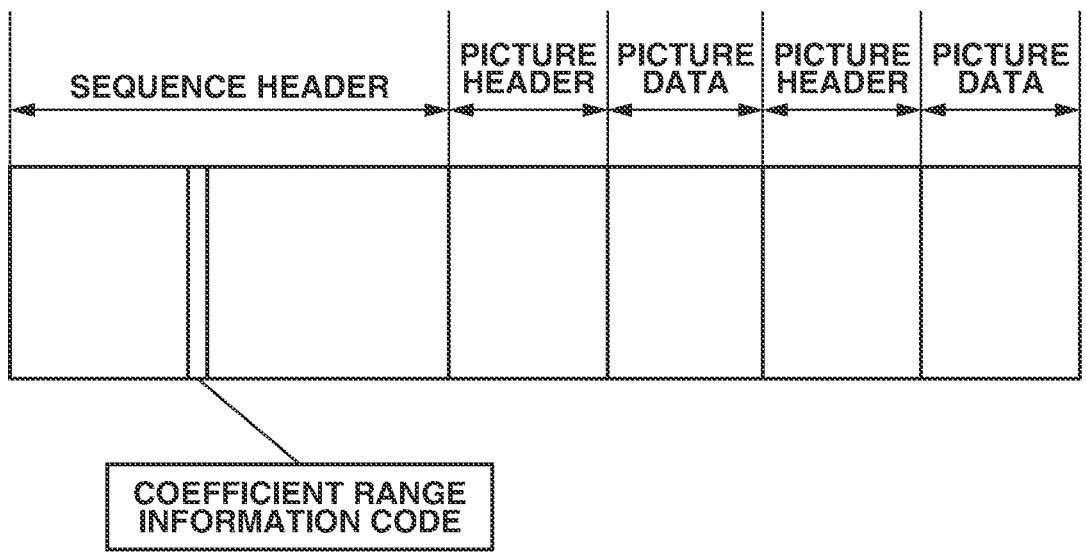
FIG. 6A is a diagram illustrating an example of a bitstream structure generated by an encoding device and decoded by a decoding device.
Figure 6B:
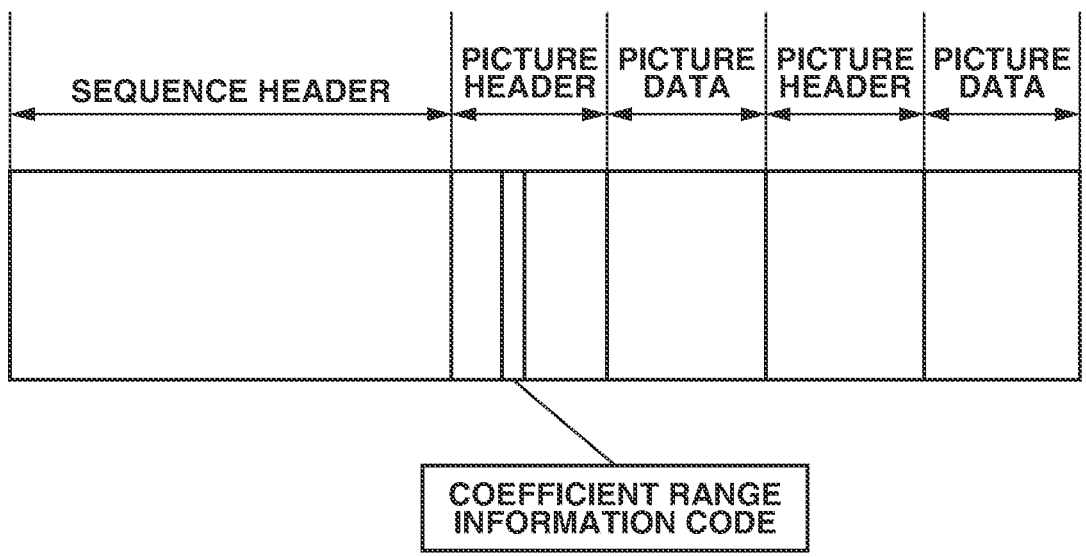
FIG. 6B is a diagram illustrating an example of a bitstream structure generated by an encoding device and decoded by a decoding device.

FIG. 6A is an example of the data structure of a bitstream output in the present exemplary embodiment. The coefficient range information code is included in a sequence header. However, the encoded position is not limited thereto and may be included a picture header section as illustrated in FIG. 6B or a header section consisting of a plurality of pictures.

Figure 3:
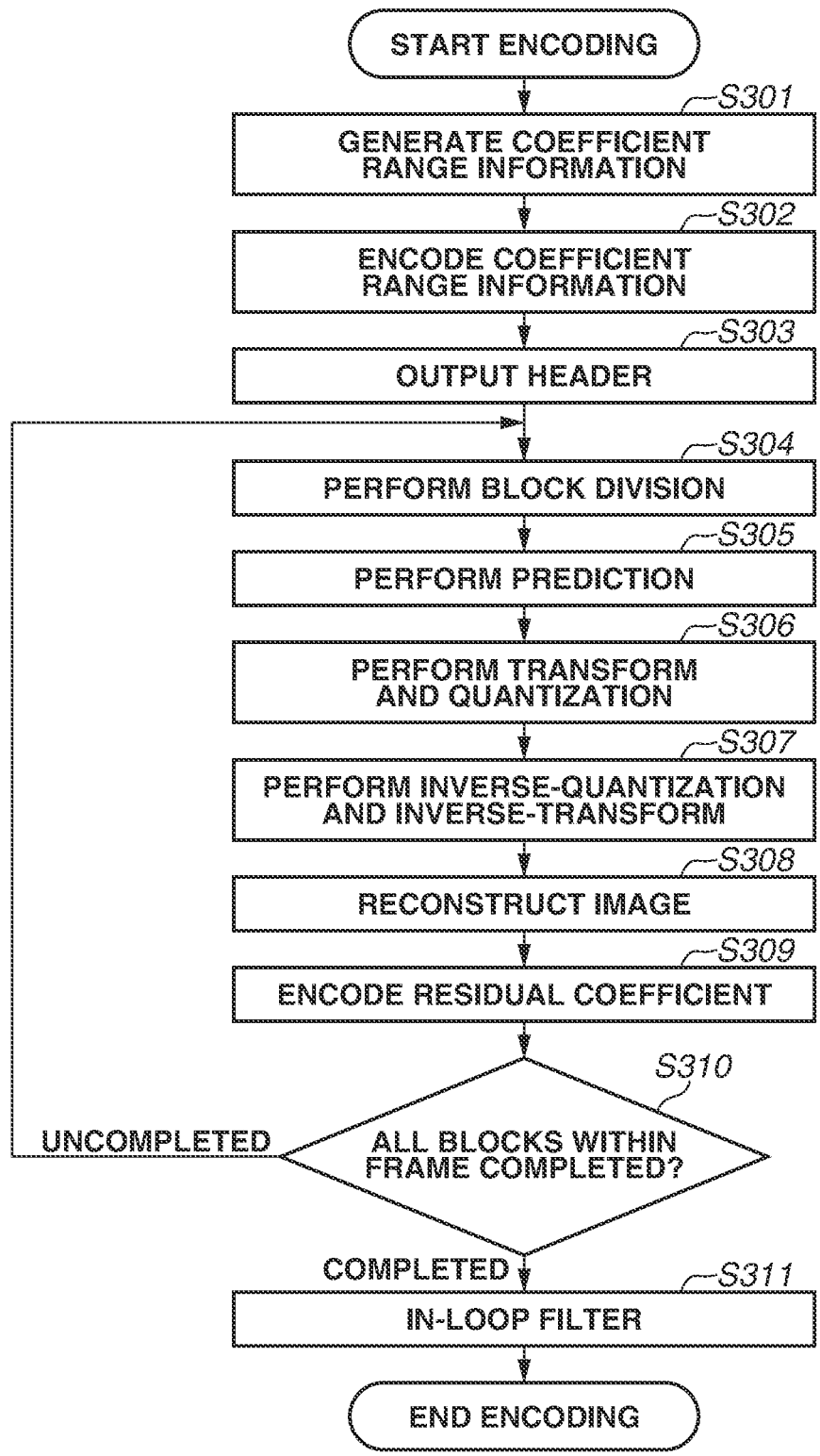
FIG. 3 is a flowchart illustrating image encoding processing in the image encoding device.

FIG. 3 is a flowchart illustrating encoding processing performed for 1 frame by the control unit 150 in the image encoding device 100 according to the exemplary embodiment.

First, prior to image encoding, in step S301, the control unit 150 controls the coefficient range information generation unit 103 to generate coefficient range information.

In step S302, the control unit 150 controls the integration encoding unit 111 to encode the coefficient range information generated in step S301 to generate a coefficient range information code.

In step S303, the control unit 150 controls the integration encoding unit 111 to encode the generated coefficient range information code, and header information necessary for encoding of image data, and to output the result.

In step S304, the control unit 150 controls the block division unit 102 to divide an input image in units of frames into basic blocks.

In step S305, the control unit 150 controls the prediction unit 104 to execute prediction processing on the image data in units of basic blocks generated in step S304 and to generate prediction information such as subblock division information and a prediction mode and predicted image data. Further, the control unit 150 controls the prediction unit 104 to calculate prediction errors from the input image data and the predicted image data.

In step S306, the control unit 150 controls the transform and quantization unit 105 to determine a coefficient range in encoding processing of this step, based on the coefficient range information generated in step S301. For example, the control unit 150 determines the coefficient range in the encoding processing of this step as the high-precision coefficient range in a case where the coefficient range information is 1, and determines the coefficient range in the encoding processing of this step as the fixed coefficient range in a case where the coefficient range information is 0. Next, the control unit 150 controls the transform and quantization unit 105 to perform orthogonal transform on the prediction errors calculated in step S305 to generate orthogonal transform coefficients. Subsequently, the control unit 150 controls the transform and quantization unit 105 to determine whether to perform low-frequency transform on the orthogonal transform coefficients generated in the subblock, and to generate information about this determination as low-frequency transform information. In a case where the low-frequency transform is determined to be performed, the control unit 150 controls the transform and quantization unit 105 to generate residual coefficients by performing the low-frequency transform and then performing quantization on a low-frequency component of the orthogonal transform coefficients. On the other hand, in a case where the low-frequency transform is determined not to be performed, the control unit 150 controls the transform and quantization unit 105 to generate residual coefficients by quantizing the orthogonal transform coefficients.

In step S307, the control unit 150 controls the inverse-quantization and inverse-transform unit 106 to determine a coefficient range in encoding processing of this step based on the coefficient range information generated in step S301. For example, the control unit 150 determines the coefficient range in the encoding processing of this step as the high-precision coefficient range in a case where the coefficient range information is 1, and determines the coefficient range in the encoding processing of this step as the fixed coefficient range in a case where the coefficient range information is 0. Next, the control unit 150 controls the inverse-quantization and inverse-transform unit 106 to reconstruct transform coefficients by inversely quantizing the residual coefficients generated in step S306. Next, the control unit 150 controls the inverse-quantization and inverse-transform unit 106 to determine whether the low-frequency transform has been performed on the subblock, based on the low-frequency transform information generated in step S306. In a case where the low-frequency transform has been performed on the subblock, the control unit 150 controls the inverse-quantization and inverse-transform unit 106 to reconstruct orthogonal transform coefficients by performing inverse low-frequency transform processing on the transform coefficients, and further to reconstruct prediction errors by performing inverse orthogonal transform on the orthogonal transform coefficients. On the other hand, in a case where the low-frequency transform has not been performed on the subblock, the control unit 150 controls the inverse-quantization and inverse-transform unit 106 to reconstruct prediction errors by performing inverse orthogonal transform on the transform coefficients.

In step S308, the control unit 150 controls the image reconstruction unit 107 to reconstruct a predicted image based on the prediction information generated in step S305, reconstruct image data from the reconstructed predicted image and the prediction errors generated in step S307, and store the reconstructed image data into the frame memory 108.

In step S309, the control unit 150 controls the encoding unit 110 to encode the prediction information generated in step S305 and the residual coefficients and the low-frequency transform information generated in step S306 to generate code data. Further, the encoding unit 110 outputs the generated code data to the integration encoding unit 111. The integration encoding unit 111 places the encoded data from the encoding unit 110 to follow the header generated earlier, and outputs the result.

In step S310, the control unit 150 determines whether encoding of all the basic blocks within a frame of interest is completed. In a case where the control unit 150 determines that the encoding is completed, the processing proceeds to step S311, and in a case where the control unit 150 determines that there is a basic block that has not been encoded, the processing returns to step S304 to continue encoding of the next basic block.

In step S311, the control unit 150 controls the in-loop filter unit 109 to perform in-loop filter processing on the image data reconstructed in step S308 and generate a filter-processed image, and then the processing ends.

The above-described configuration and operation, especially the encoding of the coefficient range information in step S302 make it possible to generate a bitstream that enables switching between encoding processes varying in arithmetic precision and implementation cost, depending on the requirement specification of an application.

In the present exemplary embodiment, the coefficient range is described as the range of possible values for the coefficients to be the results of the transform processing or the quantization processing, but may be used as a range of possible values for coefficients to be results of other encoding processing. For example, in VVC, a technique called Block-based Delta Pulse Code Modulation (BDPCM) is adopted to increase compression efficiency mainly in lossless coding. The BDPCM is a scheme that generates quantization coefficients by performing only quantization on prediction errors without performing transform thereon, instead of encoding residual coefficients obtained by performing transform and quantization on the prediction errors, and encodes differential values between the generated quantization coefficients and respective adjacent left or top quantization coefficients. Here, the coefficient range may be applied to this differential value. Whether the range of possible values for coefficients to be encoded is the high-precision coefficient range or the fixed coefficient range is thereby determined regardless of whether the BDPCM is applied, and thus it is possible to reduce the implementation cost by implementing the encoding unit supporting only one of these ranges.

Further, in the present exemplary embodiment, in a case where, for example, the bit depth of an input image is 8 bits, the coefficient range information code can be omitted. This is because the minimum coefficient value and the maximum coefficient value are equal regardless of the coefficient range information, so that redundant codes can be reduced. The bit depth of the input image for which encoding of the coefficient range information can be omitted is not limited to 8 bits, and encoding of the coefficient range information can be omitted in a case where the minimum coefficient value and the maximum coefficient value are equal regardless of the coefficient range information in other exemplary embodiments.

Figure 2:
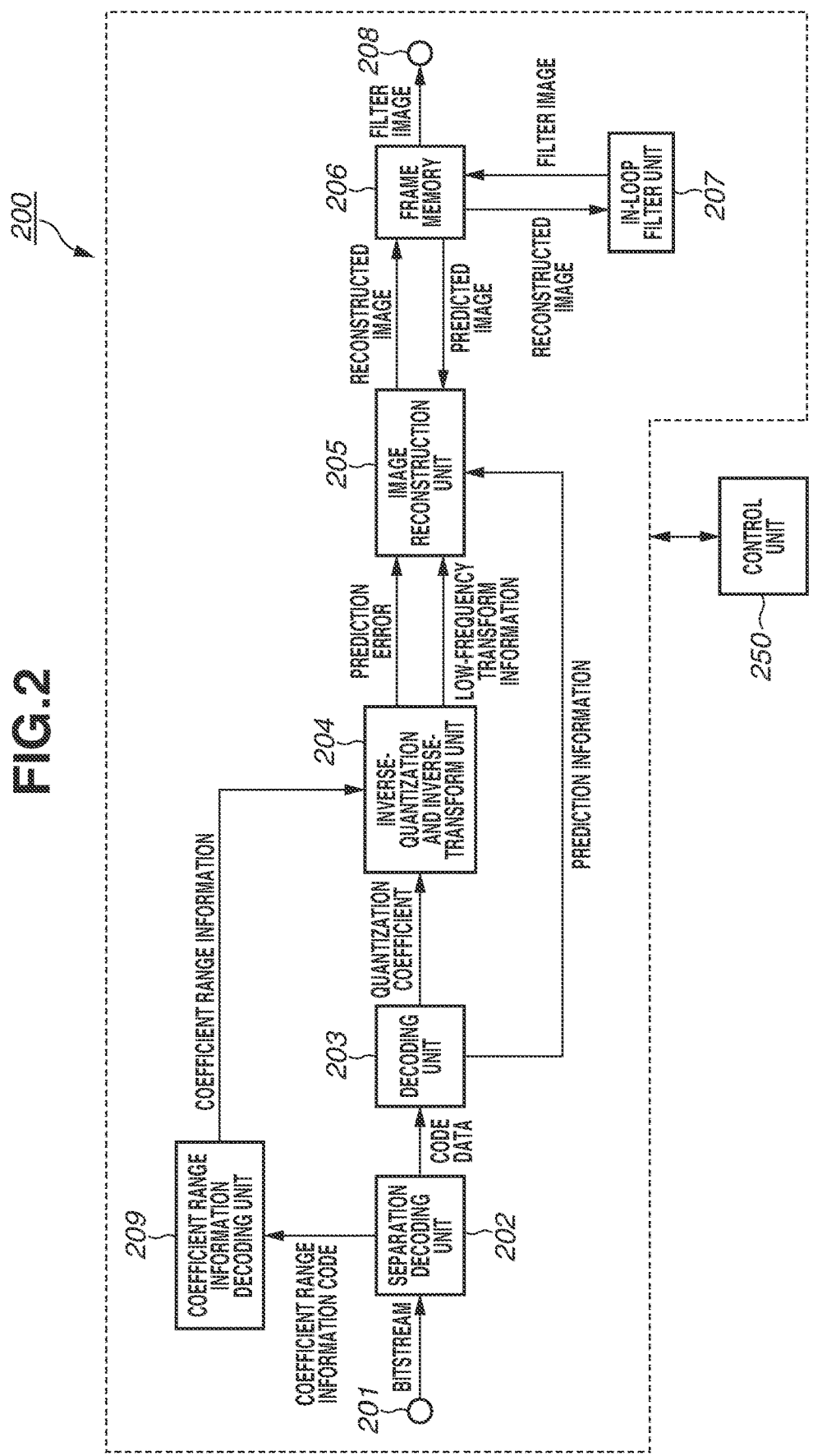
FIG. 2 is a block diagram illustrating a configuration of an image decoding device.

FIG. 2 is a block diagram illustrating a configuration of an image decoding device 200 that decodes the encoded image data generated in the image encoding device 100 in the exemplary embodiment. A configuration and operation related to decoding processing will be described below with reference to this drawing.

The image decoding device 200 includes a control unit 250 that controls the entire device. This control unit 250 includes a CPU, a ROM storing a program to be executed by the CPU, and a RAM to be used as a work area of the CPU. Further, the image decoding device 200 has an input terminal 201, a separation decoding unit 202, a decoding unit 203, an inverse-quantization and inverse-transform unit 204, an image reconstruction unit 205, a frame memory 206, an in-loop filter unit 207, an output terminal 208, and a coefficient range information decoding unit 209.

The input terminal 201 inputs an encoded bitstream, and the input source is, for example, a storage medium storing the encoded stream; however, the encoded bitstream may be input from a network, and any type of source may be used.

The separation decoding unit 202 separates information about decoding processing and code data related to coefficients from the bitstream, and decodes code data included in the header section of the bitstream. The separation decoding unit 202 according to the present exemplary embodiment separates a coefficient range information code, and outputs the coefficient range information code to the coefficient range information decoding unit 209. Further, the separation decoding unit 202 outputs code data of an image to the decoding unit 203.

The coefficient range information decoding unit 209 reconstructs coefficient range information by decoding the coefficient range information code supplied from the separation decoding unit 202, and outputs the reconstructed coefficient range information to the inverse-quantization and inverse-transform unit 204 in the subsequent stage.

The decoding unit 203 reconstructs residual coefficients, low-frequency transform information and prediction information by decoding the code data of the image output from the separation decoding unit 202.

As with the inverse-quantization and inverse-transform unit 106 in FIG. 1, the inverse-quantization and inverse-transform unit 204 inversely quantizes the residual coefficients, and reconstructs transform coefficients that are coefficients subjected to the inverse-quantization. Further, the inverse-quantization and inverse-transform unit 204 determines whether low-frequency transform has been performed on the subblock, using the low-frequency transform information. In a case where the low-frequency transform has been performed on the subblock, the inverse-quantization and inverse-transform unit 204 reconstructs orthogonal transform coefficients by performing inverse low-frequency transform processing on low-frequency transform coefficients. The inverse-quantization and inverse-transform unit 204 further reconstructs prediction errors by executing inverse orthogonal transform on these orthogonal transform coefficients or the transform coefficients. On the other hand, in a case where the low-frequency transform has not been performed on the subblock, the inverse-quantization and inverse-transform unit 204 reconstructs prediction errors by performing inverse orthogonal transform on the orthogonal transform coefficients.

The image reconstruction unit 205 refers to the frame memory 206 as appropriate and generates predicted image data based on the input prediction information. Subsequently, the image reconstruction unit 205 generates reconstructed image data from this predicted image data and the prediction errors reconstructed in the inverse-quantization and inverse-transform unit 204, and stores the generated reconstructed image data into the frame memory 206.

As with the in-loop filter unit 109 in FIG. 1, the in-loop filter unit 207 performs in-loop filter processing such as deblocking filter on the reconstructed image data stored in the frame memory 206, and stores the processed image data again into the frame memory 206.

The output terminal 208 sequentially outputs frame images stored in the frame memory 206 to the outside. An output destination is typically a display device, but may be other devices.

The operation related to image decoding by the image decoding device 200 of the exemplary embodiment described above will be described more in detail. In the present exemplary embodiment, a configuration in which an encoded bitstream is input frame by frame is adopted.

In FIG. 2, a bitstream for 1 frame input from the input terminal 201 is supplied to the separation decoding unit 202. The separation decoding unit 202 separates information about decoding processing and code data related to coefficients from the bitstream, and decodes code data included in the header section of the bitstream. Subsequently, the separation decoding unit 202 supplies a coefficient range information code included in the header section to the coefficient range information decoding unit 209, and supplies code data of the image data to the decoding unit 203. Specifically, the separation decoding unit 202 first extracts a coefficient range information code from the sequence header of the bitstream illustrated in FIG. 6A, and outputs the extracted coefficient range information code to the coefficient range information decoding unit 209. Subsequently, code data in units of basic blocks of picture data is extracted and output to the decoding unit 203.

The coefficient range information decoding unit 209 obtains coefficient range information by decoding the coefficient range information code input from the separation decoding unit 202. As with the encoding side, the high-precision coefficient range is used when the coefficient range information is 1, and the fixed coefficient range is used when the coefficient range information is 0. The coefficient range information is output to the inverse-quantization and inverse-transform unit 204. In the present exemplary embodiment, a configuration in which a 16-bit image is input on the encoding side and a 16-bit image is output on the decoding side is adopted, and thus a range of −32768 to 32767 is used when the coefficient range information is 0, and a range of −8388608 to 8388607 is used when the coefficient range information is 1.

The decoding unit 203 decodes the code data supplied from the separation decoding unit 202, reconstruct prediction information, and further reconstruct residual coefficients and low-frequency transform information. First, the decoding unit 203 reconstructs the prediction information and acquires a prediction mode used in the subblock. The decoding unit 203 outputs the reconstructed residual coefficients and low-frequency transform information to the inverse-quantization and inverse-transform unit 204 and outputs the reconstructed prediction information to the image reconstruction unit 205.

The inverse-quantization and inverse-transform unit 204 generates transform coefficients by inversely quantizing the input residual coefficients based on the above-described coefficient range. Then, the inverse-quantization and inverse-transform unit 204 determines whether low-frequency transform has been performed on the subblock, based on the input low-frequency transform information. In a case where the low-frequency transform has been performed on the subblock, the inverse-quantization and inverse-transform unit 204 reconstructs orthogonal transform coefficients by performing low-frequency transform processing on the transform coefficients, and further reconstructs prediction errors by performing inverse orthogonal transform on the orthogonal transform coefficients. On the other hand, in a case where the low-frequency transform has not been performed on the subblock, the inverse-quantization and inverse-transform unit 204 reconstructs prediction errors by performing inverse orthogonal transform on the transform coefficients. The prediction errors thus reconstructed are output to the image reconstruction unit 205.

The image reconstruction unit 205 refers to the frame memory 206 as appropriate and reconstructs a predicted image based on the prediction information input from the decoding unit 203. The image reconstruction unit 205 according to the present exemplary embodiment uses intra-prediction and/or inter-prediction, as with the prediction unit 104 on the encoding side. Specific prediction processing is similar to that of the prediction unit 104 on the encoding side, and thus the description thereof will be omitted. The image reconstruction unit 205 reconstructs image data from this predicted image and the prediction errors input from the inverse-quantization and inverse-transform unit 204, and stores the reconstructed image data into the frame memory 206. The stored image data is used for reference in prediction.

As with the in-loop filter unit 109 on the encoding side, the in-loop filter unit 207 reads out the reconstructed image from the frame memory 206 and performs in-loop filter processing such as deblocking filter. Subsequently, the in-loop filter unit 207 stores the filter-processed image into the frame memory 206 again.

The reconstructed image stored in the frame memory 206 is eventually output from the output terminal 208 to the outside (typically, to a display device).

Figure 4:
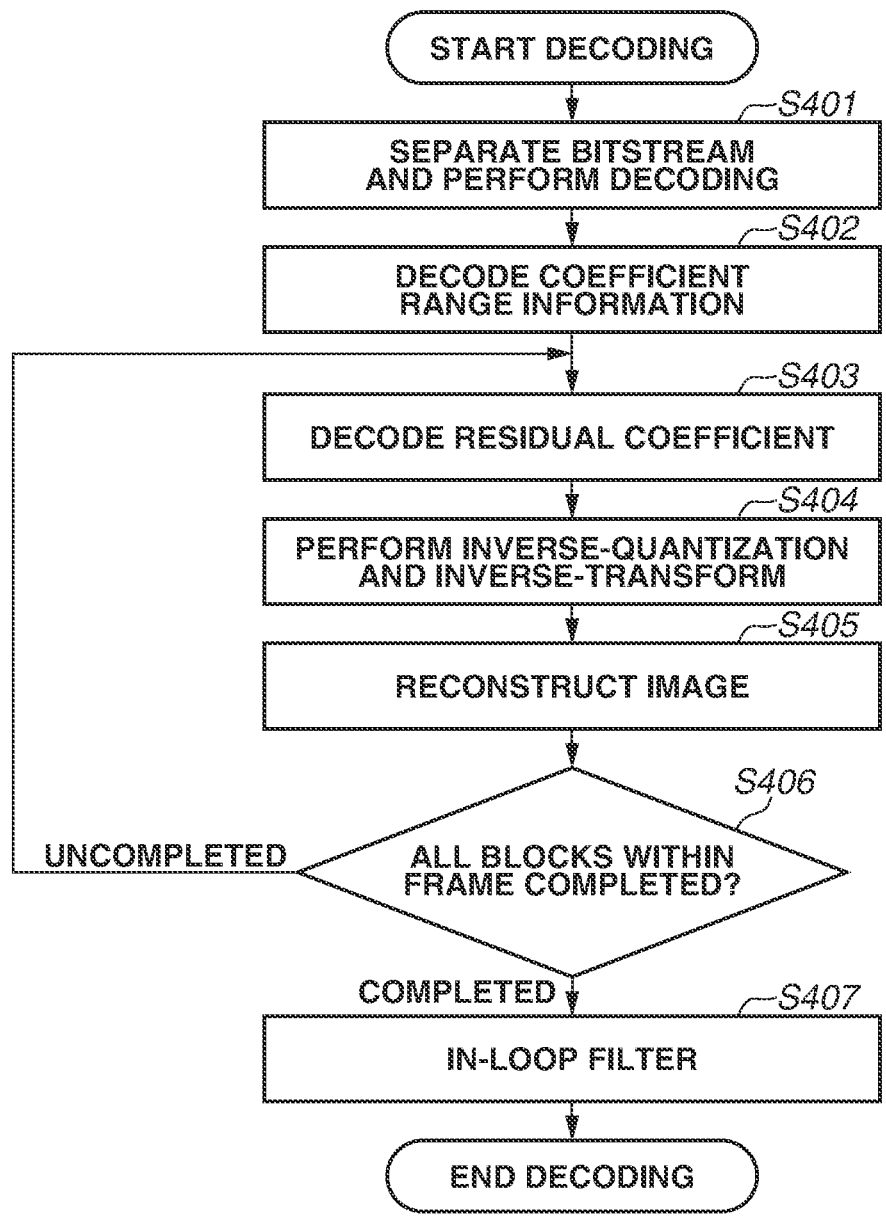
FIG. 4 is a flowchart illustrating image decoding processing in the image decoding device.

FIG. 4 is a flowchart illustrating decoding processing by the control unit 205 in the image decoding device 200 according to the exemplary embodiment.

First, in step S401, the control unit 250 controls the separation decoding unit 202 to separate information about decoding processing and code data related to coefficients from a bitstream and decode code data in a header section. To be more specific, the separation decoding unit 202 supplies a coefficient range information code to the coefficient range information decoding unit 209, and supplies code data of an image to the decoding unit 203.

In step S402, the control unit 250 controls the coefficient range information decoding unit 209 to decode the coefficient range information code reconstructed in step S401. The description of specific operation of the coefficient range information decoding unit 209 here has been already provided and thus will be omitted.

In step S403, the control unit 250 controls the decoding unit 203 to decode the code data separated in step S401, reconstruct prediction information, and reconstruct residual coefficients and low-frequency transform information.

In step S404, the control unit 250 controls the inverse-quantization and inverse-transform unit 204 to determine a coefficient range in decoding processing of this step, based on the coefficient range information decoded in step S402. For example, the control unit 150 determines the coefficient range in the decoding processing of this step as the high-precision coefficient range in a case where the coefficient range information is 1, and determines the coefficient range in the decoding processing of this step as the fixed coefficient range in a case where the coefficient range information is 0. Next, the control unit 250 controls the inverse-quantization and inverse-transform unit 204 to generate transform coefficients by inversely quantizing the residual coefficients reconstructed in step S403. Further, the control unit 250 controls the inverse-quantization and inverse-transform unit 204 to determine whether low-frequency transform has been performed on the subblock, based on the low-frequency transform information reconstructed in step S403. In a case where the low-frequency transform has been performed on the subblock, the control unit 250 controls the inverse-quantization and inverse-transform unit 204 to reconstruct orthogonal transform coefficients by performing inverse low-frequency transform processing on the transform coefficients and further reconstruct prediction errors by performing inverse orthogonal transform on the orthogonal transform coefficients. On the other hand, in a case where the low-frequency transform has not been performed on the subblock, the control unit 250 controls the inverse-quantization and inverse-transform unit 204 to reconstruct prediction errors by performing inverse orthogonal transform on the transform coefficients.

In step S405, the control unit 250 controls the image reconstruction unit 205 to reconstruct an image based on the prediction information generated in step S403. Specifically, the image reconstruction unit 205 refers to the frame memory 206 and reconstructs a predicted image based on the prediction information. At this time, the image reconstruction unit 205 uses intra-prediction and/or inter-prediction, as in step S305 on the encoding side. Subsequently, the image reconstruction unit 205 reconstructs image data from the reconstructed predicted image and the prediction errors generated in S404, and stores the reconstructed image data into the frame memory 206.

In step S406, the control unit 250 determines whether decoding of all the basic blocks within the frame of interest is completed. In a case where the decoding is completed, the processing proceeds to step S407, and in a case where there is an unencoded basic block, the processing returns to step S403 for the next basic block to be decoded.

In step S407, the control unit 250 controls the in-loop filter unit 207 to perform in-loop filter processing on the image data reconstructed in step S405 and generates a filter-processed image, and the processing ends.

The above-described configuration and operation make it possible to decode the encoded bitstream generated in the image encoding device 100 described above, i.e., a bitstream that enables switching between decoding processes varying in arithmetic precision and implementation cost depending on the requirement specification of an application.

In the present exemplary embodiment, the coefficient range is described as the range of possible values for the coefficients obtained as the results of the inverse-quantization processing or the inverse-transform processing, but may be used as a range of possible values for a coefficient obtained as a result of other decoding processing; for example, as with the encoding side, this coefficient range may be applied in BDPCM processing.

$$dz[x][y]=\text{Clip3}(\text{CoeffMin},\text{CoeffMax},dz[x-1][y]+dz[x][y]) \quad (2)$$

(where, Clip3 (a, b, c) indicates processing of clipping a value c, using a minimum value a and a maximum value b.) The above expression (2) is one of calculation formulas used in decoding processing using BDPCM, and is an expression in which a differential value is added to a quantization coefficient $dz[x-1][y]$ on the left, and clipping processing is performed using a coefficient range in reconstruction of a quantization coefficient $dz[x][y]$. As with the expression (1), CoeffMin and CoeffMax of the expression (2) correspond to the minimum coefficient value and the maximum coefficient value in FIG. 8. In a case where the coefficient range information is 0, i.e., the fixed coefficient range is used, the quantization coefficient $dz[x][y]$ that is an output of the expression (2) takes a range of −32768 to 32767 and can be expressed in signed 16 bits. In this case, 16-bit addition/multiplication commands and the like can be used in the inverse-quantization processing that is the subsequent decoding processing, and thus there is an advantage that the implementation cost is reduced. On the other hand, in a case where the coefficient range information is 1, i.e., the high-precision coefficient range is selected, the implementation cost in the subsequent decoding processing such as the inverse-quantization processing increases, but decoding processing with high arithmetic precision can be realized. As a result, a bitstream generated with increased compression efficiency on the encoding side can be decoded to have higher image quality.

Each processing unit of the image encoding device 100 and the image decoding device 200 according to the exemplary embodiment is described to be configured by hardware. However, the processing performed by each of these processing units illustrated in the drawings may be configured by a computer program.

Figure 5:
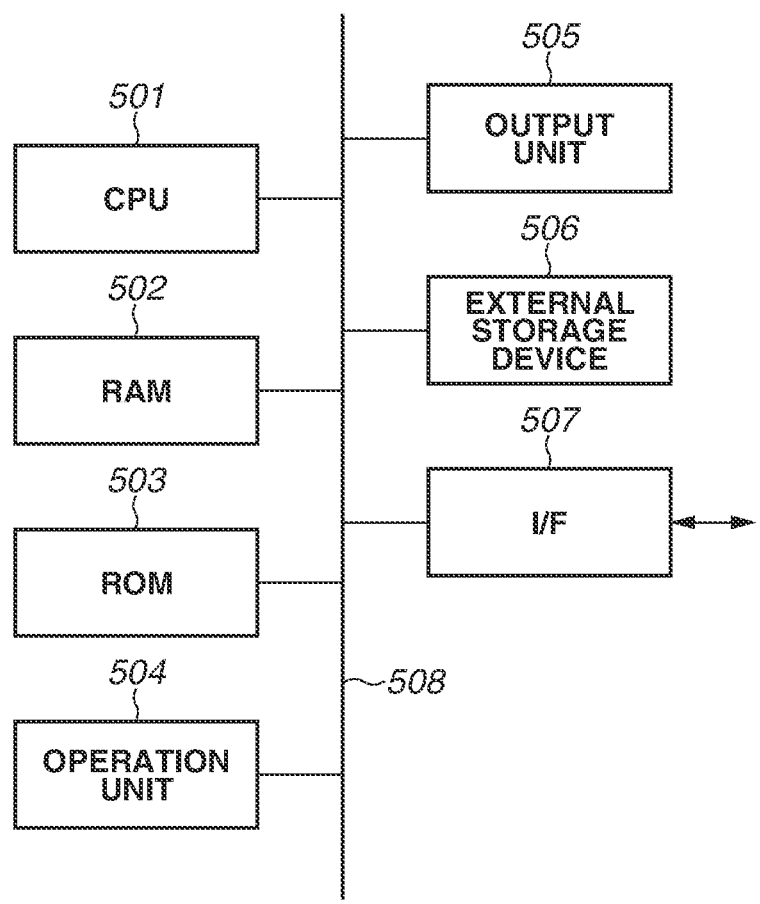
FIG. 5 is a diagram illustrating a computer hardware configuration.

FIG. 5 is a block diagram illustrating an example of a computer hardware configuration applicable to the image encoding device 100 and the image decoding device 200 according to the above-described exemplary embodiment.

A CPU 501 controls the entire computer using a computer program and data stored in a RAM 502 and a ROM 503, and executes each process described above to be performed by the image encoding device 100 or the image decoding device 200 according to the above-described exemplary embodiment. In other words, the CPU 501 functions as each processing unit illustrated in FIG. 1 and FIG. 2.

The RAM 502 has an area for temporarily storing data and the like acquired from an external storage device 506 or from the outside via an interface (I/F) 507. Further, the RAM 502 is also used as a work area that the CPU 501 uses when executing various types of processing. For example, the RAM 502 can be assigned as a frame memory or can provide other various areas as appropriate.

The ROM 503 stores setting data of the computer, a boot program, and the like. An operation unit 504 is composed of a keyboard, a mouse, and the like, and a user of the computer can input various instructions to the CPU 501 by operating the operation unit 504. A display unit 505 displays a result of processing by the CPU 501. The display unit 505 is configured by, for example, a liquid crystal display.

The external storage device 506 is a large-capacity information storage device represented by a hard disk drive device. The external storage device 506 stores an operating system (OS) and a computer program (an application program) for causing the CPU 501 to realize the function of each unit illustrated in FIG. 1 and FIG. 2. Further, the external storage device 506 may store each piece of image data to be processed.

The computer program and data stored in the external storage device 506 are appropriately loaded into the RAM 502 under the control of the CPU 501, are to be processed by the CPU 501. Networks such as a LAN and the Internet and other devices such as a projection apparatus and a display apparatus can be connected to the I/F 507, and the computer can acquire and transmit various kinds of information via this I/F 507. 508 is a bus that connects the above-described units.

When the present device is turned on in the configuration described above, the CPU 501 executes the boot program stored in the ROM 503, loads the OS stored in the external storage device 506 into the RAM 502, and executes the loaded OS. Subsequently, the CPU 501 loads an application program related to encoding or decoding from the external storage device 506 into the RAM 502 and executes the loaded application program under the control of the OS. As a result, the CPU 501 functions as each processing unit in FIG. 1 or FIG. 2, and the present device functions as the image encoding device or the image decoding device.

Other Exemplary Embodiments

The present invention can also be realized by processing of supplying a program for implementing one or more functions in the above-described exemplary embodiment to a system or apparatus via a network or a storage medium and causing one or more processors in a computer of the system or apparatus to read and execute the program. The present invention can also be realized by a circuit (for example, an ASIC) that realizes the one or more functions.

According to each of the above-described exemplary embodiments, a range of possible values for coefficient values in encoding or decoding processing can be adaptively determined.

The present invention is not limited to the above-described exemplary embodiments and various changes and modifications can be made within the spirit and scope of the present invention. Therefore, to make the scope of the present invention public, the following claims are appended.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding device comprising:
a prediction unit configured to generate prediction errors being a difference between (a) a predicted image obtained by prediction processing for a sub-block in an input image and (b) the sub-block;
a first transform unit configured to generate first transform coefficients by performing orthogonal transform on the prediction errors;
a second transform unit configured to generate second transform coefficients by performing Low Frequency Non-Separable Transform (LFNST) processing on the first transform coefficients;
a quantization unit configured to generate quantization coefficients by performing quantization processing on the second transform coefficients; and
an encoding unit configured to encode the quantization coefficients,
wherein the encoding unit encodes information indicating whether a range of possible values at least taken by the second transform coefficients is to be (a) a first range determined based on a bit depth or (b) a second range which is a fixed range and which is not dependent on the bit depth,
wherein, in a case where the information indicates that the range of possible values at least taken by the second transform coefficients is to be the first range determined based on the bit depth, a range of possible values taken by Block-based Delta Pulse Code Modulation (BDPCM) process is the first range determined based on the bit depth, and
wherein, in a case where the information indicates that the range of possible values at least taken by the second transform coefficients is to be the second range which is the fixed range and which is not dependent on the bit depth, the range of possible values taken by the BDPCM process is the second range.

2. The image encoding device according to claim 1, wherein it is determined whether to use a quantization matrix, and
wherein it is determined that the quantization matrix is not used in a case where the LFNST processing is applied.

3. An image decoding device that decodes an image from a bitstream, the image decoding device comprising:
a decoding unit configured to decode quantization coefficients from the bitstream;
an inverse-quantization unit configured to derive first transform coefficients by performing inverse-quantization processing on the quantization coefficients;
a first transform unit configured to derive second transform coefficients by performing inverse Low Frequency Non-Separable Transform (LFNST) processing on the first transform coefficients; and,
a second transform unit configured to derive prediction errors by performing inverse orthogonal transform processing on the second transform coefficients,
wherein the decoding unit decodes information indicating whether a range of possible values at least taken by the first transform coefficients is to be (a) a first range determined based on a bit depth or (b) a second range which is a fixed range and which is not dependent on the bit depth, from the bitstream,
wherein, in a case where the information indicates that the range of possible values at least taken by the first transform coefficients is to be the first range determined based on the bit depth, a range of possible values taken by Block-based Delta Pulse Code Modulation (BDPCM) process is the first range determined based on the bit depth, and
wherein, in a case where the information indicates that the range of possible values at least taken by the first transform coefficients is to be the second range which is the fixed range and which is not dependent on the bit depth, the range of possible values taken by the BDPCM process is the second range.

4. An image encoding method comprising:
generating prediction errors being a difference between (a) a predicted image obtained by prediction processing for a sub-block in an input image and (b) the sub-block;
generating first transform coefficients by performing orthogonal transform on the prediction errors;
generating second transform coefficients by performing Low Frequency Non-Separable Transform (LFNST) processing on the first transform coefficients;
generating quantization coefficients by performing quantization processing on the second transform coefficients;
encoding the quantization coefficients; and
encoding information indicating whether a range of possible values at least taken by the second transform coefficients is to be (a) a first range determined based on a bit depth or (b) a second range which is a fixed range and which is not dependent on the bit depth,
wherein, in a case where the information indicates that the range of possible values at least taken by the second transform coefficients is to be the first range determined based on the bit depth, a range of possible values taken by Block-based Delta Pulse Code Modulation (BDPCM) process is the first range determined based on the bit depth, and
wherein, in a case where the information indicates that the range of possible values at least taken by the second transform coefficients is to be the second range which is the fixed range and which is not dependent on the bit depth, the range of possible values taken by the BDPCM process is the second range.

5. An image decoding method of decoding an image from an input bitstream, the image decoding method comprising:
decoding quantization coefficients from the bitstream;
deriving first transform coefficients by performing inverse-quantization processing on the quantization coefficients;

deriving second transform coefficients by performing inverse Low Frequency Non-Separable Transform (LFNST) processing on the first transform coefficients;

deriving prediction errors by performing inverse orthogonal transform processing on the second transform coefficients; and decoding information indicating whether a range of possible values at least taken by the first transform coefficients is to be (a) a first range determined by a bit depth or (b) a second range which is a fixed range and which is not dependent on the bit depth, wherein, in a case where the information indicates that the range of possible values at least taken by the first transform coefficients is to be the first range determined based on the bit depth, a range of possible values taken by Block-based Delta Pulse Code Modulation (BDPCM) process is the first range determined based on the bit depth, and wherein, in a case where the information indicates that the range of possible values at least taken by the first transform coefficients is to be the second range which is the fixed range and which is not dependent on the bit depth, the range of possible values taken by the BDPCM process is the second range.

6. A non-transitory computer-readable storage medium storing a program for causing a computer to execute a method, the method comprising:

generating prediction errors being a difference between (a) a predicted image obtained by prediction processing for a sub-block in an input image and (b) the sub-block;

generating first transform coefficients by performing orthogonal transform on the prediction errors;

generating second transform coefficients by performing Low Frequency Non-Separable Transform (LFNST) processing on the first transform coefficients;

generating quantization coefficients by performing quantization processing on the second transform coefficients;

encoding the quantization coefficients; and encoding information indicating whether a range of possible values at least taken by the second transform coefficients is to be (a) a first range determined based on a bit depth or (b) a second range which is a fixed range and which is not dependent on the bit depth, wherein, in a case where the information indicates that the range of possible values at least taken by the second transform coefficients is to be the first range determined based on the bit depth, a range of possible values taken by Block-based Delta Pulse Code Modulation (BDPCM) process is the first range determined based on the bit depth, and wherein, in a case where the information indicates that the range of possible values at least taken by the second transform coefficients is to be the second range which is the fixed range and which is not dependent on the bit depth, the range of possible values taken by the BDPCM process is the second range.

7. A non-transitory computer-readable storage medium storing a program for causing a computer to execute a method for decoding an image from an input bitstream, the method comprising:

decoding quantization coefficients from the bitstream;

deriving first transform coefficients by performing inverse-quantization processing on the quantization coefficients;

deriving second transform coefficients by performing inverse Low Frequency Non-Separable Transform (LFNST) processing on the first transform coefficients;

deriving prediction errors by performing inverse orthogonal transform processing on the second transform coefficients; and decoding information indicating whether a range of possible values at least taken by the first transform coefficients is to be (a) a first range determined based on a bit depth or (b) a second range which is a fixed range and which is not dependent on the bit depth, wherein in a case where the information indicates that the range of possible values at least taken by the first transform coefficients is to be the first range determined based on the bit depth, a range of possible values taken by Block-based Delta Pulse Code Modulation (BDPCM) process is the first range determined based on the bit depth, and wherein in a case where the information indicates that the range of possible values at least taken by the first transform coefficients is to be the second range which is the fixed range and which is not dependent on the bit depth, the range of possible values taken by the BDPCM process is the second range.

8. The image encoding device according to claim 1, wherein the BDPCM process is a process of deriving a difference of quantized coefficients adjacent to each other among quantized coefficients generated by quantization for prediction errors which are difference between (a) a predicted image obtained by prediction process for a given sub-block in an input image and (b) the given sub-block.

9. The image encoding device according to claim 1, wherein, in a case where the bit depth is 8, the first range and the second range are same.

10. The image decoding device according to claim 3, wherein it is determined whether to use a quantization matrix, and wherein it is determined that the quantization matrix is not used, in a case where the LFNST processing is applied.

11. The image decoding device according to claim 3, wherein the BDPCM process is a process of adding a difference value to a quantization coefficient to the left of a given quantization coefficient, to derive the given quantization coefficient.

12. The image decoding device according to claim 3, wherein, in a case where the bit depth is 8, the first range and the second range are same.

* * * * *